(12) United States Patent
Beghuin (10) Patent No.: US 9,671,287 B2
(45) Date of Patent: Jun. 6, 2017

(54) HYPERSPECTRAL IMAGING (71) Applicant: LAMBDA-X, Nivelles (BE)

(72) Inventor: Didier Beghuin, Herne (BE)

(73) Assignee: LAMBDA-X, Nivelles (BE)

( * ) Notice: Subject to any disclaimer, the term of this patent is extended or adjusted under 35 U.S.C. 154(b) by 192 days.

(21) Appl. No.: 14/762,179

(22) PCT Filed: Jan. 24, 2014

(86) PCT No.: PCT/EP2014/051438
§ 371 (c)(1),
(2) Date: Jul. 20, 2015

(87) PCT Pub. No.: WO2014/114768
PCT Pub. Date: Jul. 31, 2014

(65) Prior Publication Data
US 2015/0355027 A1  Dec. 10, 2015

(30) Foreign Application Priority Data
Jan. 24, 2013  (EP) .................................... 13152532

(51) Int. Cl.
*G01J 3/02* (2006.01)
*G01J 3/28* (2006.01)
(Continued)

(52) U.S. Cl.
CPC ........... *G01J 3/2823* (2013.01); *G01J 3/0208* (2013.01); *G01J 3/45* (2013.01); *G01J 3/4537* (2013.01); *G01J 3/0224* (2013.01)

(58) Field of Classification Search
CPC .......... G01J 3/2823; G01J 3/45; G01J 3/4537; G01J 3/0208; G01J 3/0224
See application file for complete search history.

(56) References Cited

U.S. PATENT DOCUMENTS 4,964,707 A  10/1990 Hayashi
5,420,717 A  5/1995 Tabata
(Continued)

FOREIGN PATENT DOCUMENTS

DE  10 2008 009 044 A1  8/2009
EP       1 278 049 A1  1/2003
(Continued)

OTHER PUBLICATIONS

International Preliminary Report on Patentability and Written Opinion of the International Searching Authority mailed Jul. 28, 2015, issued in corresponding International Application No. PCT/EP2014/051438, filed Jan. 24, 2014, 5 pages.
(Continued)

*Primary Examiner* — Hwa Lee
(74) *Attorney, Agent, or Firm* — Christensen O'Connor Johnson Kindness PLLC (57) ABSTRACT

Described herein is a hyperspectral imaging system in which a polarizing beam splitter, a Wollaston prism, an optical system, and a plane mirror are arranged on an optical axis of the imaging system. An imaging detector is provided on which radiation is focused by an imaging lens. The Wollaston prism is imaged on itself by the optical system and the plane mirror so that translation of the Wollaston prism in a direction parallel to a virtual split plane of the prism effectively provides an optical path length difference that is the same for all points in the object field.

15 Claims, 4 Drawing Sheets

(51) Int. Cl.
*G01J 3/45* (2006.01)
*G01J 3/453* (2006.01)

(56) References Cited

U.S. PATENT DOCUMENTS 5,781,293 A 7/1998 Padgett
7,440,108 B2 * 10/2008 Beale .................. G01J 3/2823
356/456

FOREIGN PATENT DOCUMENTS

EP 1 598 647 A1 11/2005
EP 2 253 984 A1 11/2010
WO 2004/005870 A1 1/2004

OTHER PUBLICATIONS

Harvey, A.R., and D.W. Fletcher-Holmes, "Birefringent Fourier-Transform Imaging Spectrometer," Optics Express 12(22):5368-5374, Nov. 2004.
International Search Report mailed May 20, 2015, issued in corresponding International Application No. PCT/EP2014/051438, filed Jan. 24, 2014, 4 pages.

* cited by examiner

HYPERSPECTRAL IMAGING

CROSS-REFERENCES TO RELATED APPLICATIONS

This application is a National Stage of International Application No. PCT/EP2014/051438, filed Jan. 24, 2014, which claims priority to European Application No. 13152532.1, filed Jan. 24, 2013.

FIELD

The present disclosure relates to improvements in or relating to hyperspectral imaging and is more particularly, although not exclusively, concerned with Fourier transform spectral imaging systems.

BACKGROUND

Spectral imaging provides three-dimensional information about a subject, two dimensions being dedicated to the two spatial dimensions of the image and the third dimension comprising the spectral information. Hyperspectral imaging is a term dedicated to spectral imaging where the spectral dimension is better resolved than usual filter-based techniques, with, typically, a high number of spectral bands (100 bands or more in the visible domain) and a fine resolution (10 nm or less in the visible domain).

Spectral imaging can be performed in different ways including utilising Fourier transform based technology. Fourier transform spectral imaging requires interferogram acquisition. A plurality of physical interferometric configurations is suitable for the purpose of interferogram acquisition including Michelson interferometry, which tends to be mainly used for wavelengths in the infrared region. In addition, Mach Zender, Sagnac and polarisation interferometers can also be used.

U.S. Pat. No. 5,781,293 describes a Fourier transform spectrometer in which birefringent prisms are used to introduce the path difference between two light polarisations and a Fourier transform of the resulting interferogram at a detector that provides the spectral distribution of the incident light.

In an article by A. R. Harvey and D. W. Fletcher-Holmes titled "Birefringent Fourier-transform imaging spectrometer," Optics Express, vol. 12(22), pp. 5368-74 (2004), a Fourier transform imaging spectrometer is disclosed which comprises a birefringent interferometer utilising a matched pair of Wollaston prisms, the interferogram being produced by movement of one element in the interferometer.

A Wollaston prism is one of the possible configurations for an assembly of birefringent elements for separating polarised radiation into two orthogonally polarised components.

Whilst these configurations can be extremely compact as they provide common path type interferometers without having to use additional beam splitting elements, they tend to suffer from disadvantages. One disadvantage is economical because of the complexity of manufacturing paired Wollaston prisms. The first Wollaston prism splits the incident radiation into two polarisation components in different directions and the second Wollaston prism re-directs the two polarisation components so that they are parallel. For this configuration to work appropriately, the two Wollaston prisms must be paired and well aligned. The pairing of the Wollaston prisms is performed during production by ensuring that the wedge or split angle of the first Wollaston prism is equal to the wedge or split angle of the second Wollaston prism.

Another disadvantage relates to the field dependence of the optical path length difference, and in particular, the field dependence of the relation between the optical path length difference and the translation of the second Wollaston prism. For imaging systems where the field of view is not restricted to a single point, the principal rays of several field points arise with different incidence angles on the Wollaston prism, and the optical path length difference is thus also dependent on the incidence angle. The spectrum recovery for the different field points then must take into account this field dependence of the relation between the optical path length difference and the prism translation. For accurate spectral measurements, the same signal processing cannot be applied to all field points and therefore signal processing is more complex.

In addition, Fourier transform spectral imaging may be time consuming if many measurements need to be made and processed. Such measurements may also be disturbed by air movement.

SUMMARY

The present disclosure describes a hyperspectral imaging system which, in at least some embodiments, reduces the disadvantages described above.

The present disclosure also describes a hyperspectral imaging system having substantially reduced acquisition time which has fewer components and which does not require pairing and matching of birefringent prisms.

In accordance with a first aspect of the present disclosure, there is provided a method of performing hyperspectral imaging, the method comprising the steps of:

a) receiving polarised radiation at a first Wollaston prism located at a first position;

b) separating the polarised radiation into two orthogonally polarised components using the first Wollaston prism;

c) directing the two orthogonally polarised components to a second position using relay optics, the first Wollaston prism located at the first position being imaged at the second position;

d) recombining the two orthogonally polarised components into recombined polarised radiation at the second position;

e) projecting the recombined polarised radiation into a single polarisation state using at least one polariser; and f) modulating the recombined polarised radiation to interfere in the imaging plane;

wherein step f) comprises translating the first Wollaston prism in a direction parallel to its virtual split plane to modulate the recombined polarised radiation.

By imaging the first Wollaston prism located at the first position at the second position, it is possible to reduce the cost of manufacturing Wollaston prisms as, if two such prisms are utilised in one embodiment, these prisms no longer need to be paired. In this case, an optical system used for imaging the birefringent prism located at the first position at the second position compensates for differences between the prisms by adjusting the magnification.

In an embodiment, only one Wollaston prism is required, which is imaged on itself, thereby removing the need for two Wollaston prisms. This reduces the manufacturing costs even further as only one Wollaston prism is required.

The term "virtual split plane" as used herein refers to a plane within the Wollaston (or any birefringent) prism from which the two orthogonally polarised components appear to originate or at which the two orthogonally polarised components appear to be recombined.

In one embodiment, step c) comprises imaging the virtual split plane of the first Wollaston prism on itself. This ensures that the image of the virtual split plane of the first Wollaston prism coincides with itself using the relay optics. In addition, step d) comprises using the first Wollaston prism to recombine the two orthogonally polarised components.

In another embodiment, step c) comprises imaging the first Wollaston prism on a second Wollaston prism located at the second position, the virtual split plane being reversed in the second Wollaston prism. In this embodiment, the second Wollaston prism is oriented and positioned such that its virtual split plane coincides with the image of the virtual split plane of the first Wollaston prism. In addition, step d) comprises using the second Wollaston prism located at the second position to recombine the two orthogonally polarised components. In this embodiment, step f) may comprise translating one of the first and second Wollaston prisms in a direction parallel to its respective virtual split plane to modulate the polarised radiation.

In accordance with another aspect of the present disclosure, there is provided a hyperspectral imaging system for performing hyperspectral imaging, the system comprising:

a first Wollaston prism located at a first position for separating polarised radiation into two orthogonally polarised components;

an optical system for directing the two orthogonally polarised components to a second position and for imaging the first Wollaston at the second position;

recombining means for recombining the two orthogonally polarised components into recombined polarised radiation at the second position, the recombining means including at least one polariser;

an imaging detector having an imaging plane; and an imaging lens for focusing the recombined polarised radiation on the imaging plane of the imaging detector; and translation means for translating at least the first Wollaston prism in a direction parallel to its virtual split plane.

By translating the first Wollaston prism in a direction parallel to its virtual split plane, lateral shear produced in the two orthogonally polarised components by the first Wollaston prism is at least substantially reduced, and, for at least some angles of incidence, the optical path length difference is substantially the same for all the points in the object field and the lateral shear is substantially eliminated. This results in a hyperspectral imaging system that is substantially independent of the angle of incidence and hence processing is much simplified.

In one embodiment, the distance between the first and second positions is zero and the optical system includes at least one lens and a reflection element for reflecting the radiation back through the optical system so that the first Wollaston prism is imaged on itself. The reflection element may be a plane mirror.

By using at least one lens and a plane mirror, collimation of the two orthogonally polarised beams is ensured. In addition, a virtual split plane is provided within the Wollaston prism which can be imaged on itself, thereby eliminating the need for more than one Wollaston prism.

Additionally, a beam splitter is provided for transmitting the incident radiation to the first Wollaston prism and for reflecting radiation towards the imaging detector. In one embodiment, the beam splitter is a polarising beam splitter.

In an alternative embodiment, at least one polariser may be associated with the beam splitter for polarising the incident radiation.

In another embodiment, a second Wollaston prism is located at the second position between the optical system and the imaging detector, the optical system imaging the first Wollaston prism on the second Wollaston prism.

This has the advantage that the two Wollaston prisms do not need to be matched due to the imaging of one Wollaston prism on the other.

It will be appreciated that, as the first Wollaston prism is imaged on the second Wollaston prism, either one of the Wollaston prisms can be translated in a direction parallel to its virtual split plane. In an embodiment, the translation means is associated with the second Wollaston prism. However, this will depend on the particular arrangement of the hyperspectral imaging system.

In this embodiment, first and second polarisers are provided which are associated with respective ones of the first and second Wollaston prisms.

BRIEF DESCRIPTION OF THE DRAWINGS

For a better understanding of the present disclosure, reference will now be made, by way of example only, to the accompanying drawings in which.

DETAILED DESCRIPTION

The present disclosure includes descriptions of particular embodiments with reference to the drawings, but the invention is not limited thereto. The drawings described are only schematic and are non-limiting. In the drawings, the size of some of the elements may be exaggerated and not drawn to scale for illustrative purposes.

It will be understood that the terms "vertical" and "horizontal" are used herein to refer to particular orientations of the figures and these terms are not limitations to the specific embodiments described herein.

In addition, for some of the figures (in particular FIGS. 5 to 8), although some of the axes appear in the plane of the figure, there is, in reality, an angle of 45° between the plane of the figure and the illustrated optical axis.

Figure 1:
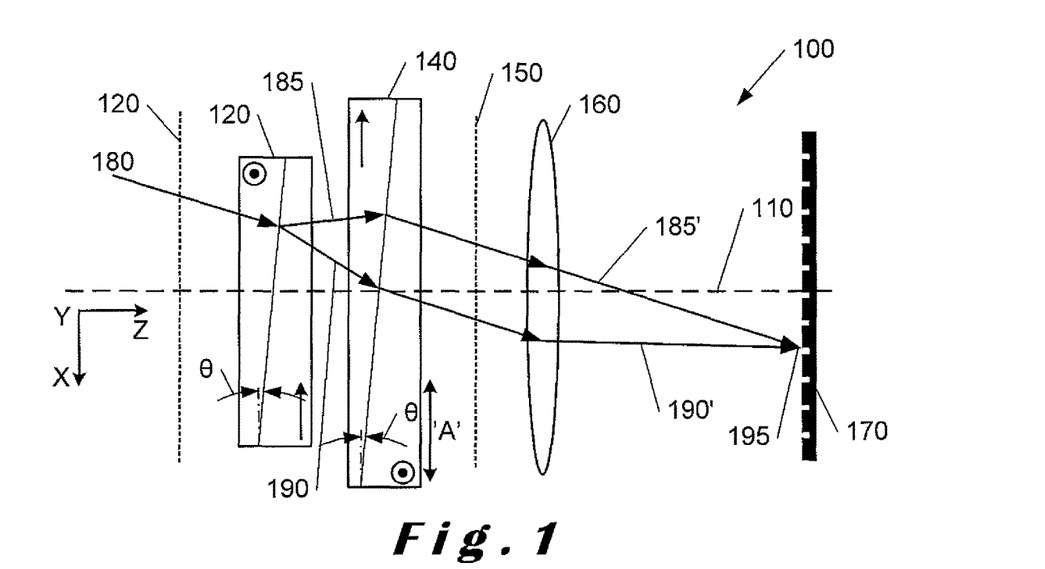
FIG. 1 illustrates a conventional birefringent polarising interferometer used in Fourier transform imaging systems.

FIG. 1 illustrates a conventional birefringent polarising interferometer 100 that can form part of Fourier-transform hyperspectral imager as described in the article by Harvey et al. discussed above. The interferometer 100 has an optical axis 110 on which a first polariser 120, first and second Wollaston prisms 130, 140, a second polariser 150, an imaging lens 160 and an imaging detector 170 are arranged as shown. The two Wollaston prisms 130, 140 have equal and opposite split plane angles θ with polarisation axes indicated by arrows and circles as shown.

Incident light or radiation from a scene, indicated by input ray 180, is polarised by the first polariser 120 into linearly polarised light at 45° to the optic axes of the Wollaston prisms 130, 140. The linearly polarised light is resolved by the first Wollaston prism 130 into two equal orthogonally polarised components 185, 190 having equal amplitude and diverging slightly on exiting the first Wollaston prism 130. Transmission through the second Wollaston prism 140 refracts the two components so that they propagate collinearly through the second polariser 150, as indicated by rays 185', 190', and are recombined by the imaging lens 160 to a common location 195 at the imaging detector 170 where they interfere. These rays bear an optical path difference which was introduced between the orthogonally polarised components. This path difference is uniform across the width of the aperture and is modulated by translation of the second Wollaston prism 140 with respect to the optical axis 110 in the directions indicated by arrow 'A,' that is, in a direction perpendicular to the normal of the Wollaston prism entrance face.

As shown, the first Wollaston prism 130 splits the incident radiation into the polarisation components 185, 190, which diverge in two different directions. The second Wollaston prism 140 brings the two polarisation components 185', 190' parallel again. As described above, the two Wollaston prisms 130, 140 must be paired and well aligned.

As the first and second polarisers 120, 150 pass the radiation of a specific polarisation type, these can be used for selective transmission or rejection of radiation at a particular wavelength. For simplicity, only light incident normally to the input surface of the first Wollaston prism 130 is normally considered.

Translation of the second Wollaston prism 140 in the directions indicated by arrow 'A' introduces a time varying path difference between the two components 185', 190', enabling an interferogram to be recorded as a function of the lateral displacement of the second Wollaston prism 140 with respect to the first Wollaston prism 130.

The optical path length difference produced by the two Wollaston prisms with equal splitting angles can be approximated as $$\Delta_{OPL} = 2bh \tan\theta$$

where $\Delta_{OPL}$ is the optical path length difference for the two orthogonal polarisations, b is the birefringence of the material, h is the lateral displacement of the second Wollaston prism with respect to the first one, and θ is the prism wedge angle.

Figure 2:
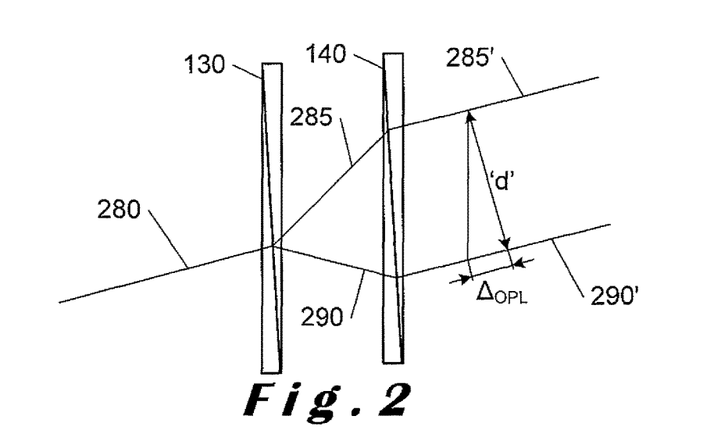
FIG. 2 illustrates the field dependent difference in optical path length of two components of an incident ray produced by a paired Wollaston prism arrangement.

FIG. 2 illustrates an input ray 280 to the Wollaston prisms 130, 140 of FIG. 1. After passing through the first Wollaston prism 130, the ray 280 is split into two orthogonally polarised rays 285, 290. After passing through the second Wollaston prism 140, the rays 285', 290' become parallel but are separated by a shear distance, d. For off-axis propagating rays, this shear produces an optical path length difference, $\Delta_{OPL}$, as shown. The shear distance, d, can be calculated from the properties of the Wollaston prisms, that is, the thickness of each prism, the refractive indexes of the materials from which they are made, their wedge angles, and the separation of the two Wollaston prisms along the optical axis (not shown in FIG. 2) of the imaging system.

It will be appreciated that as the distance between the two Wollaston prisms 130, 140 along the optical axis increases, the lateral shear between the two polarised rays 285', 290' also increases, and this lateral shear induces the optical path length difference, which is field dependent and null for on-axis propagating rays. For systems in which significant shear is present and which have a significant field of view of similar spectrum emissions, the imaged scene is filled with fringes.

If the second Wollaston prism 140 is positioned such that $\Delta_{OPL}$ is 0 for the central field point, then the extreme field points in the direction of the shear have a residual optical path length difference, $\Delta_{OPLresidual}$, which are of opposite sign. The acquisition of interferograms for the full field using symmetrical interferometry from the $\Delta_{OPL}$ being zero, several additional images need to be acquired to compensate for twice the $\Delta_{OPLresidual}$. This leads to unnecessary additional acquisition time.

As described above, the relationship $\Delta_{OPL} = 2bh \tan\theta$ is only valid in the case of normal incidence, and, for other field points, the additional shear-related optical path length difference needs to be considered. For imaging systems where the field of view is not restricted to a single point, the principal rays of the several field points will be incident on the first Wollaston prism 130 with different angles of incidence, and therefore the optical path length difference will also change in accordance with the angle of incidence. This means that the optical path length difference is also dependent on the angle of incidence. As the second Wollaston prism 140 is translated in the directions indicated by arrow 'A' in FIG. 1, the optical path length difference will also be affected. The spectrum recovery for the different field points then must take into account the field dependence of the optical path length difference with translation of the second Wollaston prism 140. For accurate spectral measurements, it is therefore not possible to apply the same signal processing to all field points, resulting in more complex processing.

In accordance with the present disclosure, birefringent components are used for hyperspectral imaging in a new imaging interferometric system which solves the limitations of the imaging system described in the article by Harvey et al. In the new interferometric imaging system, the object is assumed to be at infinity, and if the object is not at infinity, optics are utilised to put it at infinity. In this case, all rays originating from a single object point entering the imaging interferometric system are parallel.

The present disclosure refers below to the use of Wollaston prisms. It will readily be understood that other birefringent prisms may be used where appropriate.

Figure 3:
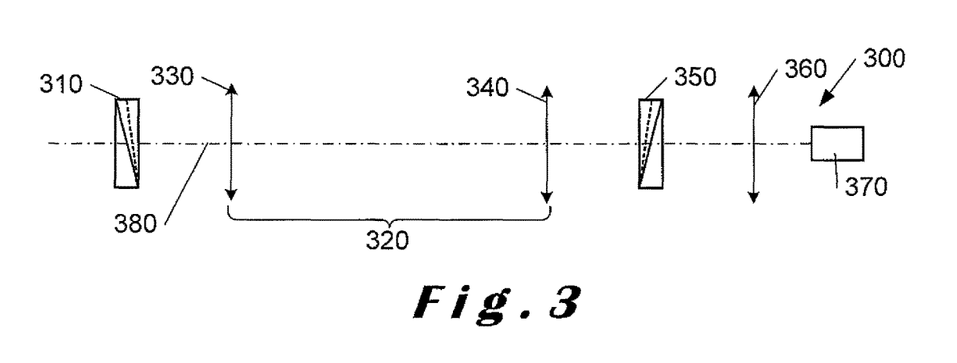
FIG. 3 illustrates a first embodiment of an imaging system in accordance with the present disclosure.
Figures 4, 5:
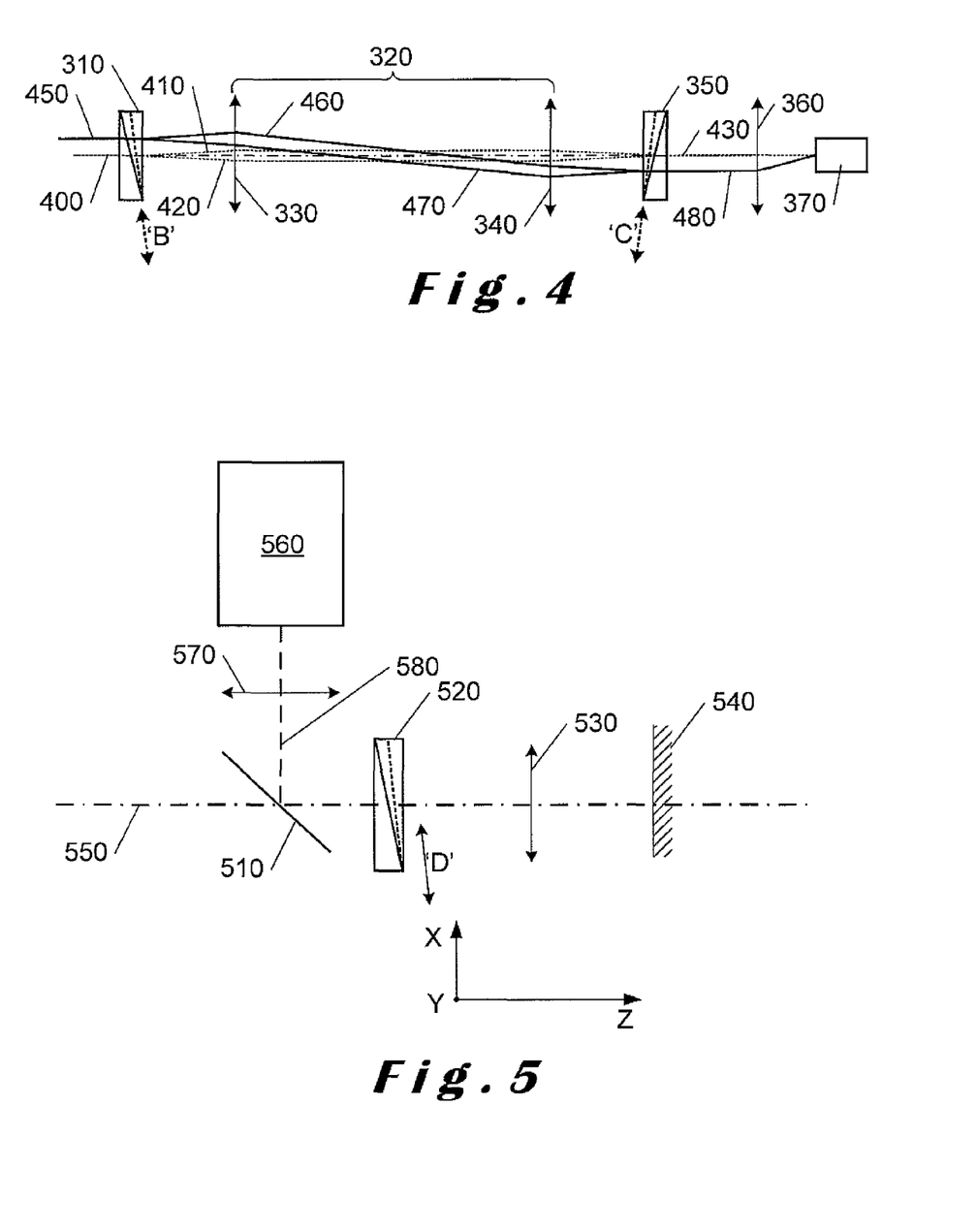
FIG. 4 is similar to FIG. 3 and illustrates the absence of shear in this configuration.
FIG. 5 illustrates a second embodiment of an imaging system in accordance with the present disclosure.

FIGS. 3 and 4 illustrate a first embodiment of the present disclosure in which one Wollaston prism is imaged on a second Wollaston prism. In this specific embodiment, polarisers are not shown but are required for the operation of the optical system. Referring initially to FIG. 3, an imaging system 300 is shown which comprises a first Wollaston prism 310, an optical system 320 comprising first and second lenses 330, 340, a second Wollaston prism 350, an imaging lens 360 and a detector system 370 arranged on an optical axis 380. First and second polarisers (not shown for clarity) are also provided in front of the first Wollaston prism 310 and after the second Wollaston prism 350 in a similar way to that described above with reference to FIG. 1. In this case, the second Wollaston prism 350 is a mirror image of the first Wollaston prism 310 in that the split plane is effectively reversed.

FIG. 4 illustrates the behaviour of two example rays 400, 450 from an on-axis object point. The first ray 400 is the principal ray from an on-axis object point and is aligned with the optical axis 380 of the imaging system 300. Ray 400 is incident on the first Wollaston prism 310 and is split into two component rays 410, 420 having orthogonal polarisations. The component rays 410, 420 pass through the optical system 320 and are imaged on the second Wollaston prism 350. The second Wollaston prism 350 recombines the two component rays 410, 420 to form an output ray 430 which is detected by the detector system 370. As shown, the component rays 410, 420 are parallel to one another as they pass through the optical system 320.

The second ray 450 is parallel to the first ray 400 but spaced from the optical axis 380 as shown. In a similar way to the first ray 400, the first Wollaston prism 310 splits the second ray 450 into two component rays 460, 470 having orthogonal polarisations. The component rays 460, 470 pass through the optical system 320 and are imaged on the second Wollaston prism 350. The second Wollaston prism 350 recombines the two component rays 460, 470 to form an output ray 480 which is detected by the detector system 370. As shown, the component rays 460, 470 are parallel to one another as they pass through the optical system 320, although they are at an angle with respect to the optical axis 380 of the imaging system 300. Both illustrative rays 400, 450 superimpose in the image plane of the detector system 370.

In this embodiment, the optical system 320 (including lenses 330, 340) is used to image the Wollaston prism 310 on a second Wollaston prism 350. In this case, the shear can be cancelled for this on-axis field point. This is realised in practice by adjusting the longitudinal position of the Wollaston prisms 310, 350. For other field points where the incident rays are not parallel to the optical axis 380 of the imaging system 300, the shear is also minimal, although in practice some residual shear due to walk off in the birefringent material occurs.

The advantages of this configuration are therefore twofold, namely, the lateral shear is effectively cancelled and the related field dependent optical path length difference is also cancelled, and there is no necessity to produce Wollaston prisms that are exactly paired. If the two Wollaston prisms have differences in split angles, by tuning the magnification of the optical system 320 imaging one Wollaston prism on the other Wollaston prism, it is possible to compensate for this inaccuracy in fabrication of the Wollaston prisms. This is easily realised in practice by adjusting the longitudinal position of the two Wollaston prisms, that is, the distance between the two Wollaston prisms along the optical axis 380 of the imaging system 300.

In this embodiment, the lateral translation of either one of the two Wollaston prisms 310, 350 will change the optical path length difference, $\Delta_{OPL}$, as described above with reference to FIG. 1. This is because of the imaging of one Wollaston prism on the other, and the Wollaston prism that is laterally translated is considered to be the "second" Wollaston prism when comparing to prior art imaging systems. However, if this translation of the chosen "second" Wollaston prism occurs perpendicularly to the optical axis 380 of the imaging system 300, then the translation will create some shear, and thus, inevitably, some associated field dependent optical path length difference. The re-introduction of some shear is thus detrimental to the calibration as the relationship between the effective $\Delta_{OPL}$ and the translation is different for every field point. If the Wollaston prism is translated parallel to its virtual split plane, this problem is significantly reduced, as in this case, the translation of the "second" Wollaston prism does not create any shear after ray recombination at a first approximation. As shown in FIG. 4, the directions of movement of the "second" Wollaston prism is indicated by arrow 'B' for Wollaston prism 310 and by arrow 'C' for Wollaston prism 350, that is, in a direction parallel to the respective virtual split planes. The virtual split plane is described in more detail below with reference to FIG. 9.

Another embodiment of an imaging system 500 in accordance with the present disclosure is illustrated in FIG. 5. The imaging system 500 comprises a polarising beam splitter 510, a single Wollaston prism 520, an optical system 530, and a plane mirror 540 arranged on optical axis 550 of the imaging system 500. In addition, an imaging detector 560 is provided, which may be a camera or other suitable imaging device. An imaging lens 570 is located between the polarising beam splitter 510 and the imaging detector 560 to focus the output beam (not shown) onto the imaging detector 560 as will be described in more detail below with reference to FIGS. 6 to 8.

Here, the arrangement is preferably such that, if z is the optical axis, and if its orthogonal direction in the plane of the drawing paper is x, the third orthogonal y is perpendicular to the plane of the drawing paper, and the beam splitter 510 is preferably oriented such that the optical axis 580 after reflection is perpendicular to the optical axis 550 and oriented at 45° from both the x- and y-axes.

As shown, the plane mirror 540 allows the Wollaston prism 520 to be imaged on itself. The longitudinal position of the plane mirror 540 along the optical axis 550 can be adjusted in depth to ensure that a collimated entrance beam also exits the imaging system 500 as a collimated exit beam.

It will readily be appreciated that the plane mirror 540 may be comprise any suitable reflection element that, in combination with a suitable optical system (one or more lenses, for example), allows the Wollaston prism to be imaged on itself. For example, the reflection element may comprise a concave mirror and the optical system comprises an appropriate combination of lenses.

The polarising beam splitter 510 is oriented at an angle of 45° with respect to the optical axis 550 such that transmitted rays from a point radiation source enter the Wollaston prism 520 with a predetermined linear polarisation. In this respect, the polarising beam splitter 510 replaces the polariser 120 in FIG. 1 and the polariser (not shown) in FIG. 3. The predetermined linear polarisation is 45° with respect to the optical axis of the Wollaston prism 520, that is, at 45° from both the x- and y-axes.

In this embodiment, the Wollaston prism 520 is translated in the directions indicated by arrow 'D' with respect to the optical axis 550 of the imaging system 500, that is, in a direction parallel to its virtual split plane.

The polarising beam splitter 510 also serves to reflect radiation returning through the imaging system 500 towards the imaging detector 560, as will be described in more detail below with reference to FIGS. 6 to 8.

As an alternative to a polarising beam splitter 510, a non-polarising beam splitter may be used in combination with a polariser of the type described above with reference to FIG. 1. As the imaging system 500 effectively images the Wollaston prism 520 on itself, only one polariser is required. As before, the object is assumed to be at infinity.

The longitudinal position of the mirror along the optical axis 550 of the imaging system 500 may be adjusted to ensure that collimated entrance beam also exits the imaging system as a collimated output beam.

Figure 6:
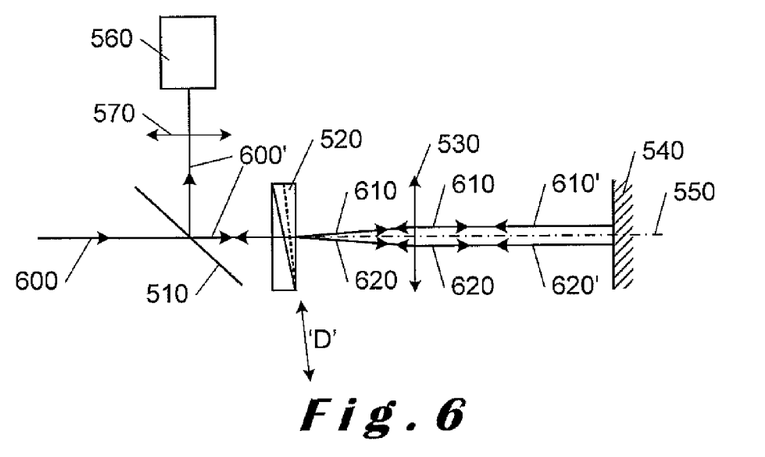
FIG. 6 is similar to FIG. 5 but illustrates the situation for principal rays or incident rays coincident with the optical axis.
Figure 7:
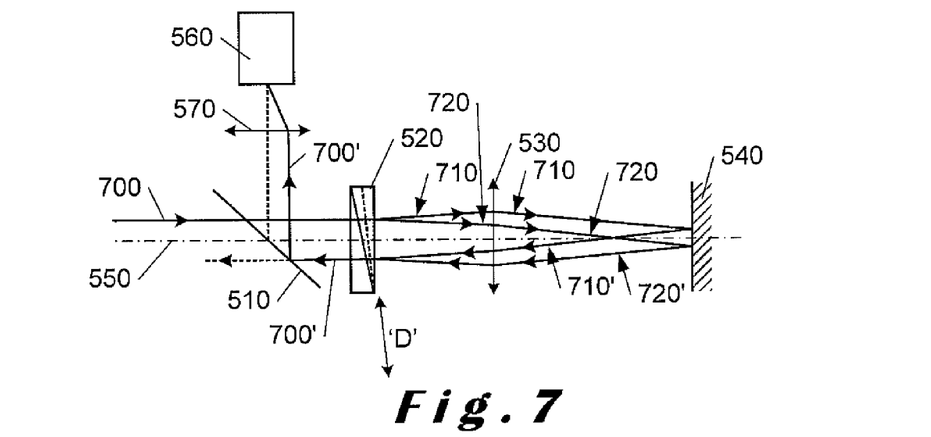
FIG. 7 is similar to FIG. 5 but illustrates the situation for marginal rays or incident rays which are parallel to, but not coincident with, the optical axis.
Figure 8:
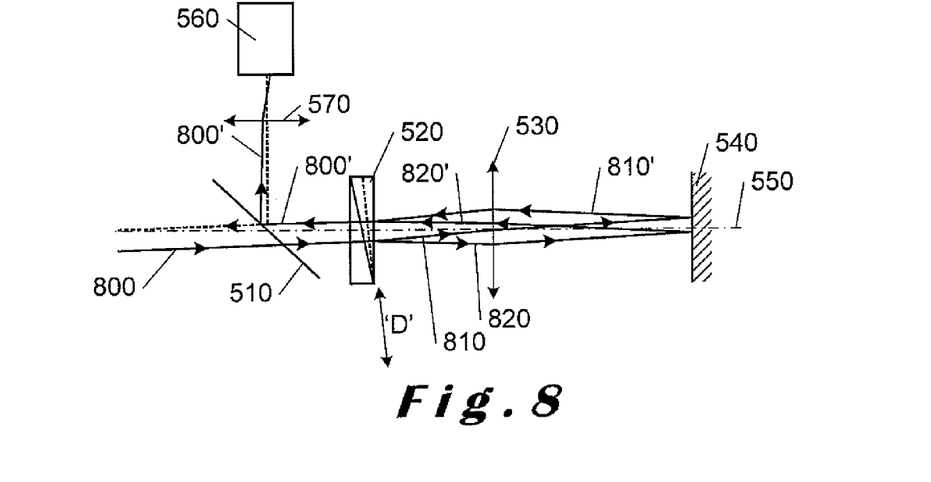
FIG. 8 is similar to FIG. 5 but illustrates the situation for incident rays which are at an angle to the optical axis.

FIGS. 6 to 8 illustrate the behaviours of three example rays through the imaging system 500. In FIG. 6, a ray 600 from an on-axis object point is shown. The ray 600 is transmitted by the polarising beam splitter 510 to the Wollaston prism 520 where it is split into two orthogonally polarised component rays 610, 620, which are slightly divergent. The optical system 530 is positioned so that the Wollaston prism 520 is at its focal point so that the component rays 610, 620 are incident normally on the plane mirror 540 and reflected back along the same path, the reflected rays being indicated as 610' and 620' respectively. At the Wollaston prism 520, the two reflected component rays 610', 620' are recombined as output ray 600', which is then reflected at the polarising beam splitter 510 to the imaging lens 570 for imaging onto a focal plane of the imaging detector 560. In this case, as the ray 600 is aligned with the optical axis 550 of the imaging system 500, it passes undeviated through the imaging lens 570.

Here, the distance between the Wollaston prism 520 and its image (the "second" Wollaston prism) is reduced to 0 and therefore there is very small dependence with the field. In practice, the birefringence induced walk-off creating shear is not completely compensated for and a residual shear induced, field dependent, optical path length difference remains. However, this optical path length difference is considerably less than the one induced by the longitudinal separation between the two Wollaston prisms 130, 140 shown in FIG. 1.

By having an imaging configuration with a one-to-one magnification, the split angle produced by the Wollaston prism in one direction is perfectly compensated by the second pass in the other direction. The economic advantage of this is twofold because only one Wollaston prism is required instead of two, and, because there is no need to have very precise control of the Wollaston angles during manufacture as no pairing is necessary.

In FIG. 7, a ray 700 from the same object as that shown in FIG. 6 but which is parallel to the optical axis 550 of the imaging system 500 is shown. The ray 700 is transmitted by the polarising beam splitter 510 to the Wollaston prism 520 where it is split into two orthogonally polarised component rays 710, 720, which are slightly divergent. In this case, the optical system 530 refracts the component rays 710, 720 and directs them onto the plane mirror 540. Again, the reflected component rays 710', 720' are directed by the optical system 530 back to the Wollaston prism 520 where they are recombined as output ray 700'. As before, output ray 700' is then reflected at the polarising beam splitter 510 to the imaging lens 570 for imaging onto a focal plane of the imaging detector 560.

In FIG. 8, a ray 800 from an off-axis object is shown. The ray 800 is transmitted by the polarising beam splitter 510 to the Wollaston prism 520 where it is split into two orthogonally polarised component rays 810, 820, which are slightly divergent. In this case, the optical system 530 refracts the component rays 810, 820 and directs them onto the plane mirror 540. Again, the reflected component rays 810', 820' are directed by the optical system 530 back to the Wollaston prism 520 where they are recombined as output ray 800'. As before, output ray 800' is then reflected at the polarising beam splitter 510 to the imaging lens 570 for imaging onto a focal plane of the imaging detector 560. For small field angles, the lateral shear is very small and the field dependent optical path length difference is also very limited.

The one-to-one magnification provided by the imaging system shown in FIG. 5 provides an additional advantage not obtainable with conventional imaging systems as described with reference to FIG. 1. In conventional imaging systems, the translation of the "second" Wollaston prism is in a direction perpendicular to the normal of the Wollaston prism entrance face and only the lateral displacement, h, is determined for an incident angle which is normal to the entrance face as described above.

It will readily be appreciated that the recombining of the two orthogonally polarised components is effectively a reverse operation to that of splitting the polarised radiation into the two orthogonally polarised components. During splitting, a polarised beam having equal polarisation component intensities in the ordinary and extraordinary directions of the Wollaston prism is split into two components, as is well known. Each component emerges from the Wollaston prism in a different direction and with a linear polarisation which is orthogonal to the linear polarisation of the other component, the two components having equal intensities. During recombining, the two linear orthogonally polarised components are deviated by the same Wollaston prism (as described above with reference to FIGS. 5 to 8) or by a second Wollaston prism (as described above with reference to FIGS. 3 and 4) to make them collinear after emerging from the relevant Wollaston prism. Recombining in this case is intended to mean rendering the polarised radiation exiting the Wollaston prism to be collinear, co-aligned or parallel. At least one polariser is provided for projecting the recombined polarised radiation into a single polarisation state as the recombined polarised radiation retains the two orthogonal polarisation states of the two orthogonally polarised components.

As described above, translation of the single Wollaston prism (FIGS. 5 to 8) or the second Wollaston prism (FIGS. 3 and 4) in a direction parallel to its virtual split plane modulates the intensity of the recombined polarised radiation. The modulated intensity is sampled to correspond to the optical path length difference, $\Delta_{OPL}$, from $-\Delta_{OPLmax}$ to $+\Delta_{OPLmax}$ or from 0 to $\pm\Delta_{OPLmax}$.

Figure 9:
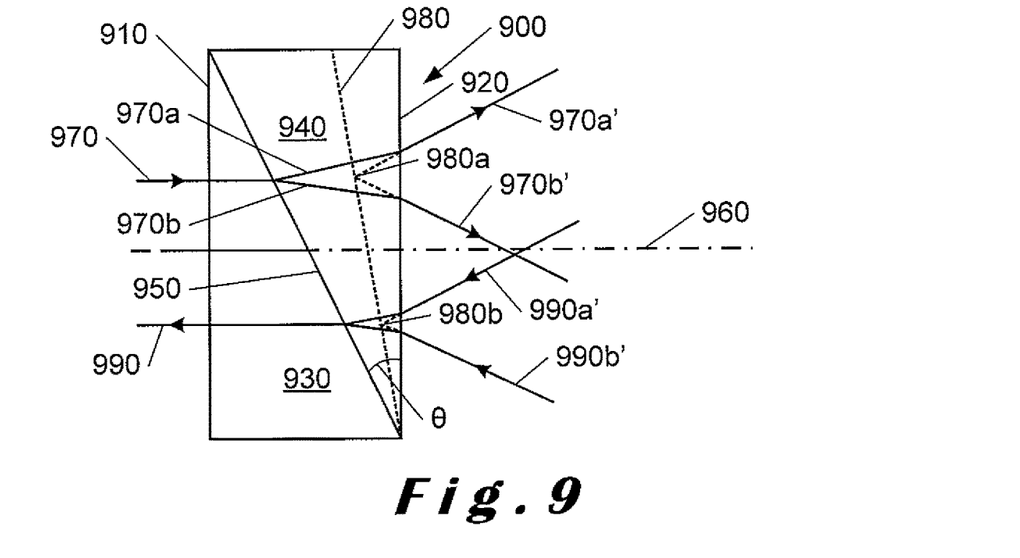
FIG. 9 illustrates a Wollaston prism and a virtual split plane.

Referring now to FIG. 9, a virtual split plane in a Wollaston prism will be described. In FIG. 9, a Wollaston prism 900 is shown having an entrance face 910 and an exit face 920 with a split angle $\theta$. The prism 900 comprises two birefringent materials 930, 940 that are aligned along a split plane 950 related to the wedge or split angle $\theta$. The prism also has an optical axis 960 as shown. Rays entering the prism 900 along a normal to the entrance face 910 undergo a double refraction. A ray 970 is shown in FIG. 9 by way of example. The first refraction is due the refractive index difference due to the orthogonal orientation of the optical axes of the birefringent materials 930, 940 making up the Wollaston prism 900, and the second refraction is at the exit face 920 of the Wollaston prism 900 due to off-normal incidence as a result of the first refraction.

As shown in FIG. 9, the first refraction of the ray 970 produces two component rays 970a, 970b having orthogonal polarisations, the component rays 970a, 970b diverging slightly as shown. The second refraction occurs when the two divergent component rays 970a, 970b pass out of the exit face of the prism 900 as shown by component rays 970a', 970b'. The refracted component rays 970a', 970b' appear to originate at a point 980a on a virtual split plane 980 as shown in FIG. 9. As shown, the angle of the virtual split plane 980 does not correspond to the physical wedge or split angle, θ, of the Wollaston prism 900. In a one-to-one lateral magnification imaging system, the longitudinal magnification is also one. As a result, the virtual split plane 980 can be imaged on itself without deformation. Translating the prism 900 in the direction along its virtual split plane ensures that the two component rays 970a, 970b derived from the original ray 970 at normal incidence to the entrance face 910 have no shear between polarisation component rays as the prism 900 is translated in the direction of arrow 'D' as shown in FIGS. 5 to 8. In this case, the optical path length difference, $\Delta_{OPL}$, can be expressed as:

$$\Delta_{OPL} = 4bh \tan \theta$$

As there is no shear created during translation, the dependence of the optical path length difference, $\Delta_{OPL}$, on the translation of the Wollaston prism is the same for all field points.

Similarly, for the reflected component rays 990a', 990b', there are two refractions as these rays enter the exit face 920, that is, at the exit face 920 and at the interface 950 between the two birefringent materials 930, 940. As described above, the two component rays 990a, 990b are recombined in the Wollaston prism 900 to form the reflected output ray 990. Here, the reflected component rays 990a', 990b' appear to converge at a point 980b on the virtual split plane 980 before converging at the interface 950.

Figure 10:
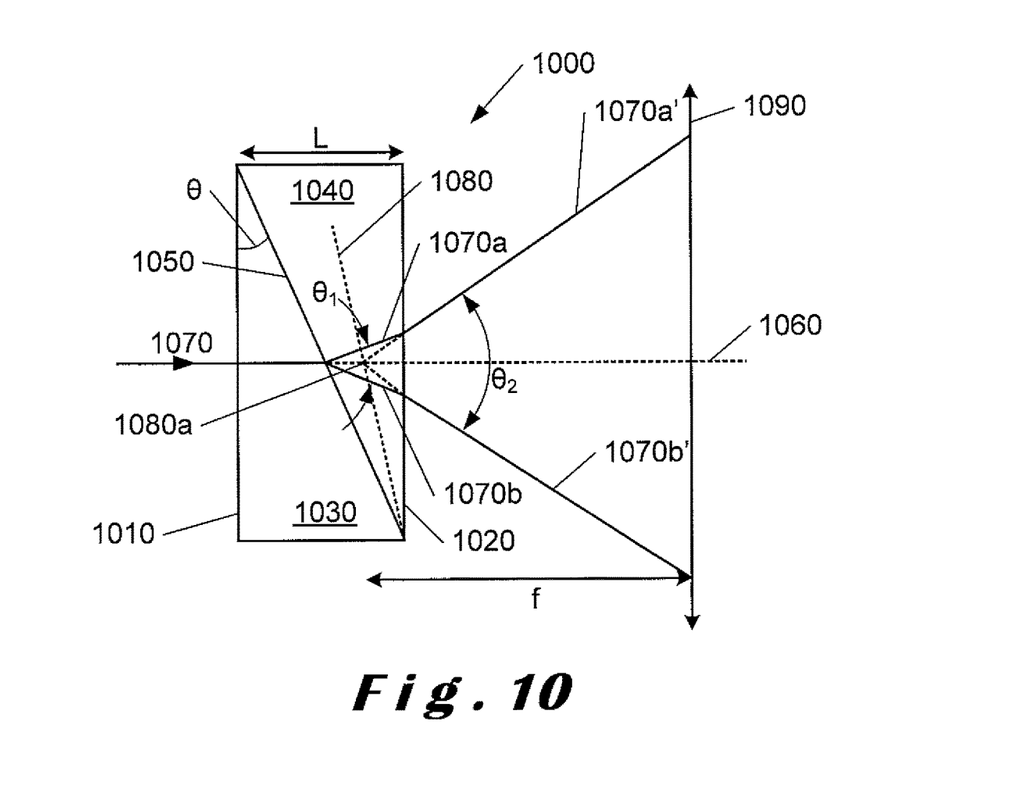
FIG. 10 is similar to FIG. 9 but illustrates the calculation of the virtual split plane angle.

Referring now to FIG. 10, the prism 1000 is shown having an entrance face 1010 and an exit face 1020. The prism 1000 has two birefringent materials 1030, 1040 with an interface 1050 between the two birefringent materials 1030, 1040. The prism 1000 is shown on optical axis 1060 of an imaging system (not shown). An example ray 1070 incident on the entrance face 1010 is divided into component rays 1070a, 1070b having an angle, $\theta_1$, between them due to refraction at the interface 1050. After refraction at the exit face 1020, the refracted component rays 1070a', 1070b' appear to diverge from a point 1080a on a virtual split plane 1080 at an angle, $\theta_2$, towards optical system 1090. The virtual split plane angle equation can be defined as:

$$x = \frac{y \tan \theta \tan \theta_1}{\tan \theta_2}$$

where y is the longitudinal coordinate along the optical axis of the imaging system and x is the lateral coordinate in the plane of FIG. 10 which is perpendicular to y. Also shown in FIG. 10 is the thickness, L, of the prism 1000 and the focal length, f, of the optical system 1090. The optical system 1090 is aligned with the Wollaston prism 1000 so that the focal point thereof is aligned with point 1080a on the virtual split plane 1080.

While illustrative embodiments have been illustrated and described, it will be appreciated that other embodiments are also possible within the scope of the present disclosure.

The invention claimed is:

1. A method of performing hyperspectral imaging, the method comprising the steps of:
   a) receiving polarised radiation at a first Wollaston prism located at a first position;
   b) separating the polarised radiation into two orthogonally polarised components using the first Wollaston prism;
   c) directing the two orthogonally polarised components to a second position using relay optics, the first Wollaston prism located at the first position being imaged at the second position;
   d) recombining the two orthogonally polarised components into recombined polarised radiation at the second position;
   e) projecting the recombined polarised radiation into a single polarisation state using at least one polariser; and
   f) modulating the recombined polarised radiation to interfere in the imaging plane;
   wherein step f) comprises translating the first Wollaston prism in a direction parallel to its virtual split plane to modulate the recombined polarised radiation.

2. A method according to claim 1, wherein step c) comprises imaging the virtual split plane of the first Wollaston prism on itself.

3. A method according to claim 2, wherein step d) comprises using the first Wollaston prism to recombine the two orthogonally polarised components.

4. A method according to claim 1, wherein step c) comprises imaging the first Wollaston prism on a second Wollaston prism located at the second position, the virtual split plane being reversed in the second Wollaston prism.

5. A method according to claim 4, wherein step d) comprises using the second Wollaston prism to recombine the two orthogonally polarised components.

6. A method according to claim 4, wherein step f) comprises translating one of the first and second Wollaston prisms in a direction parallel to its respective virtual split plane to modulate the polarised radiation.

7. A hyperspectral imaging system for performing hyperspectral imaging, the system comprising:
   a first Wollaston prism located at a first position for separating polarised radiation into two orthogonally polarised components;
   an optical system for directing the two orthogonally polarised components to a second position and for imaging the first Wollaston prism at the second position;
   recombining means for recombining the two orthogonally polarised components into recombined polarised radiation at the second position, the recombining means including at least one polariser;
   an imaging detector having an imaging plane; and
   an imaging lens for focusing the recombined polarised radiation on the imaging plane of the imaging detector; and
   translation means for translating at least the first Wollaston prism in a direction parallel to its virtual split plane.

8. A hyperspectral imaging system according to claim 7, wherein the distance between the first and second positions is zero and the optical system includes at least one lens and a reflection element for reflecting the radiation back through the optical system so that the first Wollaston prism is imaged on itself.

9. A hyperspectral imaging system according to claim 8, wherein the reflection element comprises a plane mirror.

10. A hyperspectral imaging system according to claim 8, further comprising a beam splitter for transmitting the incident radiation to the first Wollaston prism and for reflecting radiation towards the imaging detector.

11. A hyperspectral imaging system according to claim 10, wherein the beam splitter is a polarising beam splitter.

12. A hyperspectral imaging system according to claim 10, further comprising at least one polariser associated with the beam splitter for polarising the incident radiation.

13. A hyperspectral imaging system according to claim 7, further comprising a second Wollaston prism located at the second position between the optical system and the imaging detector, the optical system for imaging the first Wollaston prism on the second Wollaston prism.

14. A hyperspectral imaging system according to claim 13, wherein the translation means is associated with one of the first and second Wollaston prisms.

15. A hyperspectral imaging system according to claim 13, further comprising first and second polarisers associated with respective ones of the first and second Wollaston prisms.

* * * * *